Jan. 15, 1929.

A. W. NORDGREN 1,699,492

BUMPER SUPPORT

Filed March 10, 1928

Witness
Edward Latta

Inventor
Algot W. Nordgren
by Bair & Freeman Attorneys

Patented Jan. 15, 1929.

1,699,492

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER SUPPORT.

Application filed March 10, 1928. Serial No. 260,600.

The object of my invention is to provide a front bumper for automobiles of simple, durable and comparatively inexpensive construction.

More particularly it is my object to provide a bumper support in which an intermediate portion thereof is received within a recessed opening formed in the front ends of the side frames of the chassis of an automobile and one end of the support being also connected to a cross connecting member forming a portion of the chassis of the automobile whereby each support is connected at two points to the automobile chassis and to connect a transverse bumper element to the free ends of the supports.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1:
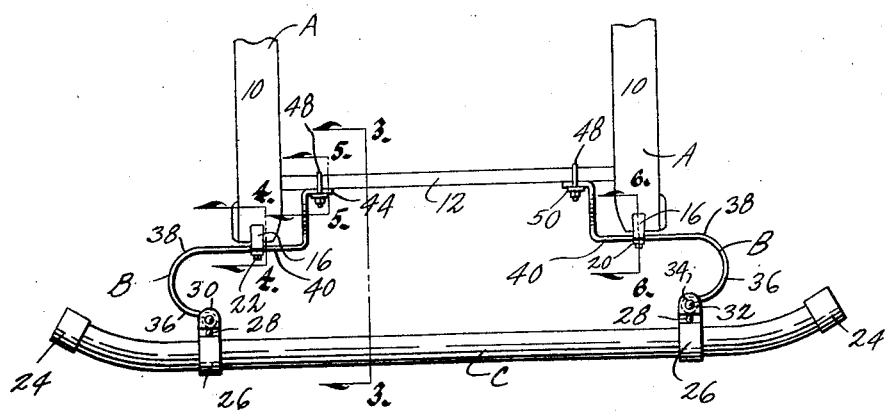
Figure 1 is a top plan view of my improved front bumper shown installed upon the front end of an automobile frame.

In the accompanying drawings I have used the reference character A to indicate generally the chassis of an automobile which includes a pair of side frame members 10 and cross connecting bar 12. The chassis A is supported by suitable springs 14 operatively connected to the chassis proper.

On the forward ends of the side frame members 10 are castings or the like 16 which are provided with a recessed opening 18. A cover plate 20 is secured to the casting 16 by means of screws or the like 22. My improved bumper is adapted to coact with the casting 16 and the cross connecting member 12 as I will describe in detail.

My bumper proper includes a pair of supporting elements B and a tubular bumper bar C. The bumper bar C extends transversely of the side frame members and in front of the automobile proper. The ends are turned rearwardly a slight amount and have placed thereover, caps 24.

A pair of spaced clamp elements 26 are amounted upon the bumper bar C. The clamp elements 26 are formed of a single piece of metal bent to form a loop for receiving the bumper proper. A locking bolt 28 extends through each of the clamp elements 26 and serves to clamp the elements 26 upon the bumper bar C.

The extreme free ends of the clamp elements 26 are spaced apart some little distance so as to provide a pair of ears 30 through which may be extended a pivot bolt 32. Each support B is connected to a pivot bolt of each of the clamp elements 26.

The supports B are formed of strap material and have eyes 34 formed in their outer ends through which the pivot bolts 32 extend. Each support is then curved outwardly as at 36 and thence recurved inwardly as at 38. A flat intermediate portion 40 is arranged substantially parallel to the bumper elements C and to the cross connecting member 12. The portion 40 is adapted to be received in the recessed opening 18 formed in the casting or fitting 16.

The clamp plate is placed against the flat portion 40 and when the screws 22 are in position, they hold the clamp plate and in turn the intermediate portion 40 of the support B is held within the opening 18. The opening 18 is of sufficient size to receive the bumper support B and thus the parts are held against any pivotal or any other undesired movement.

The portions 40 have extensions 42 which are offset upwardly and formed at right angles to the main portion 40. The ends of the offset extensions 42 are provided with inwardly directed flanges 44 so as to provide flanged ends on the bumper supports B. Each of the flanged ends 44 is formed with a pair of corresponding upper and lower notches 46.

Figure 5:
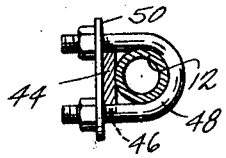
Figure 5 is a sectional view taken on the line 5—5 of Figure 1.
Figure 3:
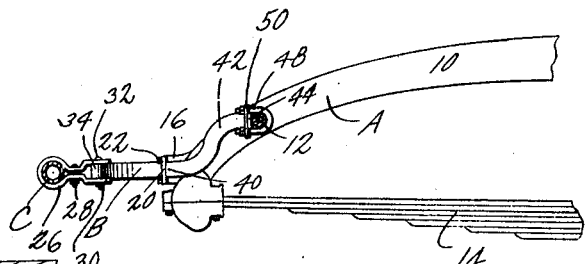
Figure 3 is a sectional view taken on the line 3—3 of Figure 1.
Figure 6:
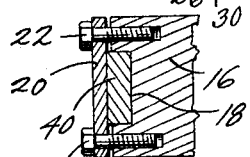
Figure 6 is an enlarged detail sectional view showing the intermediate portions of the bumper support received in the recessed opening formed on the end of the chassis.
Figure 2:
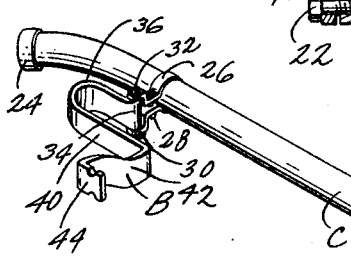
Figure 2 is a perspective view of the bumper and its support.
Figure 4:
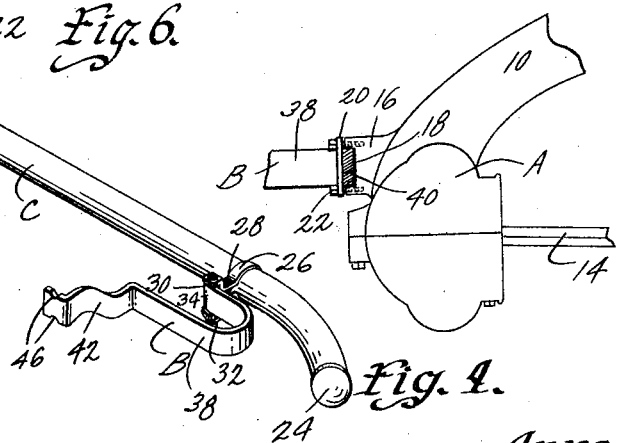
Figure 4 is a detail sectional view taken on the line 4—4 of Figure 1.

The flanged ends 44 are adapted to rest against the cross connecting bar 12 and be secured thereto by means of a U-bolt or the like 48 as clearly shown in Figure 5 of the drawings. The upper and lower notches 46 receive portions of the U-bolt 48 and thus the U-bolt is held against any lateral movement relative to the flanged ends or the cross connecting bar 12.

It will be noted that each bumper support is connected to the cross connecting bar 12 as well as to the forward ends of the side frame members 10. Each support is thus securely held in position and will support the bumper element C in proper position.

The flat intermediate portion 40 is of sufficient length so as to actually allow the bumper support and bumper to be connected to a chassis where the side frame members are at various distances apart. The portions 36 and 38 of each bumper support add materially to the appearance of the bumper proper as does the tubular bumper bar C.

The tubular bumper bar C gives me a rigid and substantial bumper element and the portions 36 and 38 serve as a spring or cushion for any impact which may be given to the bumper proper.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with an automobile chassis having a cross connecting bar, a bumper including a bumper element, a pair of spaced clamp elements adjustably mounted on said bumper element, a pair of oppositely spaced supports, said supports having one end pivotally connected to said clamp elements respectively and having their other end connected to said cross connecting bar with their intermediate portion connected to the chassis.

2. In combination with an automobile chassis having a cross connecting bar, a bumper including a bumper element, a pair of spaced clamp elements adjustably mounted on said bumper element, a pair of oppositely spaced supports, said supports having one end pivotally connected to said clamp elements respectively and extending outwardly and away from the clamp elements and thence inwardly forming a portion substantially parallel with the bumper element, said last portion having means of connection with the chassis and an offset extension on the free end of said last portion for connection with the cross connecting bar.

3. In combination with an automobile chassis having a cross connecting bar, a bumper including a bumper element, a pair of spaced clamp elements adjustably mounted on said bumper element, a pair of oppositely spaced supports, said supports having one end connected to said clamp elements respectively and extending outwardly and away from the clamp elements and thence inwardly forming a portion substantially parallel with the bumper element, said last portion having means of connection with the chassis and an offset extension on the free end of said last portion for connection with the cross connecting bar and a right angle flange on said last portion for connection to the cross connecting bar whereby each support is connected at two spaced points to the automobile chassis.

4. In combination with an automobile chassis having a cross connecting bar, a bumper including a bumper element, a pair of spaced clamp elements adjustably mounted on said bumper element, a pair of oppositely spaced supports, said supports having one end connected to said clamp elements respectively, and extending outwardly and away from the clamp elements and thence inwardly forming a portion substantially parallel with the bumper element, said last portion having means of connection with the chassis and an offset extension on the free end of said last portion for connection with the cross connecting bar, said last portion terminating in a flanged end resting against said cross connecting bar and a U-bolt for securing said flanged end thereto.

5. In combination with an automobile chassis having a cross connecting bar, a bumper including a bumper element, a pair of spaced clamp elements adjustably mounted on said bumper element, a pair of oppositely spaced supports, said supports having one end connected to said clamp elements respectively and extending outwardly and away from the clamp elements and thence inwardly forming a portion substantially parallel with the bumper element, said last portion having means of connection with the chassis and an offset extension on the free end of said last portion terminating in a flanged end resting against said cross connecting bar and a U-bolt for securing said flanged end thereto, said flanged end having notches therein for receiving said U-bolt.

6. In combination with an automobile chassis having a cross connecting bar, a bumper including a bumper element, a pair of spaced clamp elements adjustably mounted on said bumper element, a pair of oppositely spaced supports, said supports having one end pivotally connected to said clamp elements respectively and extending outwardly and away from the clamp elements and thence inwardly forming a portion substantially parallel with the bumper element, said last portion being received in a recessed opening formed in the chassis, a clamp plate for holding said portion therein and an extension projecting from the free end of said last portion and means for connecting said extension to the cross connecting member.

Des Moines, Iowa, February 20, 1928.

ALGOT W. NORDGREN.